(12) United States Patent
Thompson

(10) Patent No.: US 10,428,941 B2
(45) Date of Patent: Oct. 1, 2019

(54) DRIVE MEMBER SELECTION

(71) Applicant: QINETIQ LIMITED, Hampshire (GB)

(72) Inventor: Robert William Thompson, Hampshire (GB)

(73) Assignee: QINETIQ LIMITED, Hampshire (GB)

( * ) Notice: Subject to any disclaimer, the term of this patent is extended or adjusted under 35 U.S.C. 154(b) by 547 days.

(21) Appl. No.: 14/428,601

(22) PCT Filed: Sep. 25, 2013

(86) PCT No.: PCT/GB2013/000406
§ 371 (c)(1),
(2) Date: Mar. 16, 2015

(87) PCT Pub. No.: WO2014/049317
PCT Pub. Date: Apr. 3, 2014

(65) Prior Publication Data
US 2015/0211633 A1 Jul. 30, 2015

(30) Foreign Application Priority Data
Sep. 25, 2012 (GB) .................. 1217100.5

(51) Int. Cl.
*F16H 63/18* (2006.01)
*F16H 63/30* (2006.01)
(Continued)

(52) U.S. Cl.
CPC ........... *F16H 63/18* (2013.01); *F16D 41/185* (2013.01); *F16H 63/30* (2013.01); *F16H 63/32* (2013.01);
(Continued)

(58) Field of Classification Search
CPC ............ F16H 63/18; F16H 2063/3073; F16H 2063/3093; F16H 63/20; F16H 2063/3089;
(Continued)

(56) References Cited

U.S. PATENT DOCUMENTS 3,200,919 A 8/1965 Lanigan et al.
4,096,932 A 6/1978 Liberty, Jr.
(Continued)

FOREIGN PATENT DOCUMENTS

BE 449665 A 3/1943
CN 2793448 Y 7/2006
(Continued)

OTHER PUBLICATIONS

Machine translation of DE 10225467.*
(Continued)

*Primary Examiner* — William C Joyce
*Assistant Examiner* — Randell J Krug
(74) *Attorney, Agent, or Firm* — Kenealy Vaidya LLP

(57) ABSTRACT

A drive member selection mechanism is described, including at least one drive member and at least two selector members, wherein the drive member includes a first and second face, and further includes, on each face, at least one projection, and the selector members include, on at least one face thereof, at least one complementary projection arranged to selectively engage with a projection of a drive member, the arrangement being such that the projection(s) of a selector member and the projection(s) of the first face of a drive member may be drivingly engaged in a first torque connection and the projection(s) of a selector member and the projection(s) of the second face of a drive member may
(Continued)

be drivingly engaged in a second torque connection, wherein the second torque connection is opposed to the first torque connection.

15 Claims, 11 Drawing Sheets

(51) Int. Cl.
  *F16H 63/32* (2006.01)
  *F16D 41/18* (2006.01)
  *F16H 63/36* (2006.01)
  *F16D 11/00* (2006.01)

(52) U.S. Cl.
  CPC ........ *F16H 63/36* (2013.01); *F16D 2011/008* (2013.01); *F16H 2063/3093* (2013.01); *F16H 2063/325* (2013.01); *Y10T 74/19423* (2015.01)

(58) Field of Classification Search
  CPC .... F16H 2063/325; F16H 63/30; F16D 47/04; F16D 41/185; F16D 41/22
  USPC .......... 74/337.5, 362, 363, 473.3; 192/48.92, 192/46, 69.81
  See application file for complete search history.

(56) References Cited

U.S. PATENT DOCUMENTS

| | | | | |
|---|---|---|---|---|
| 5,297,453 | A * | 3/1994 | Chene | ...................... F16H 63/20 74/473.24 |
| 7,753,184 | B2 * | 7/2010 | Traner | .................. F16D 41/185 192/43 |
| 2006/0260895 | A1 | 11/2006 | Traner | |
| 2012/0240698 | A1 * | 9/2012 | Ogawa | ..................... F16H 63/18 74/325 |

FOREIGN PATENT DOCUMENTS

| | | | |
|---|---|---|---|
| CN | 102052455 A | 5/2011 | |
| CN | 102691757 A | 9/2012 | |
| DE | 10225467 A1 * | 12/2003 | ............. F16H 63/10 |
| DE | 10225467 A1 * | 12/2003 | ............. F16H 63/10 |
| EP | 2169265 A2 | 3/2010 | |
| GB | 1404385 A | 8/1975 | |
| JP | S6184441 A | 4/1986 | |
| WO | 0073679 A1 | 12/2000 | |
| WO | 01/29440 A1 | 4/2001 | |
| WO | 2004/099654 A1 | 11/2004 | |

OTHER PUBLICATIONS

English Translation of Dec. 16, 2015 Search Report issued in Chinese Patent Application No. 201380055848.8.
English Translation of May 24, 2016 Official Action issued in Japanese Patent Application No. 2015-532497.
Jan. 18, 2013 Search Report under Section 17(5) issued in British Application No. 1217100.5.
Oct. 1, 2013 Search Report under Section 17(5) issued in British Application No. 1217100.5.
Nov. 17, 2013 Written Opinion of the International Searching Authority issued in International Application No. PCT/GB2013/000406.

* cited by examiner

DRIVE MEMBER SELECTION

The present invention relates to apparatus and methods for drive member (e.g. gear) selection and to systems incorporating the same.

In many devices, one or more drive members may be selectable to drive or to enhance the use and effectiveness of the device. Perhaps the most common example is a gear box, in which gears are selected according to the work being done by an engine at that time.

For multi ratio gearboxes, as used in vehicles, rapid shifting between ratios is highly desirable to minimise the time when the engine or other power source is not connected to the wheels and not able to deliver useful work. Rapid shifts therefore improve vehicle performance and particularly vehicle acceleration. Many different forms of shifting mechanism are used in vehicle applications. Manual gearboxes, for example, where the driver selects gears using a lever or gear stick, generally use 'synchromesh' engagement. This type of mechanism uses complex cone brakes or other friction brake mechanisms in each gear selector hub to synchronise the speed of the gearbox shaft with the gear to be selected before allowing engagement of a so-called dog clutch. As will be appreciated by the skilled person, a 'dog clutch' is a type of clutch that couples two rotating components by interference (rather than, for example, by friction). This process first requires the disconnection of the engine from the gearbox by use of a clutch, also usually operated by the driver.

This type of gearbox has the advantage of relative simplicity compared to alternative automatic transmissions, as described below in greater detail. Manual gearboxes are also comparatively more efficient, having lower frictional losses and no parasitic power losses. However, shift times are relatively low due to the large number of operations which must be completed one after another. Shift times also are dependant on the skill of the driver. This type of gearbox however continues to be the most commonly used for light vehicles.

Automatic gearboxes are also used in many vehicles. Such automatic gearboxes usually comprise multiple epicyclical gear stages with the various ratios being selected by linking or locking various elements of the mechanism using multiple plate clutches (in which plates are coupled by friction), generally operated by hydraulic pressure. Typically, to allow for starting and to aid shifting, the engine is connected to the gearbox via a torque converter, being a fluid filled torque multiplying slipping mechanism.

This type of gearbox can achieve rapid shifting. However given (i) the relatively high power loss in the torque converter, (ii) the frictional losses in the multi-plate clutches and (iii) the parasitic power loss from the hydraulic control system, they have relative low efficiency. This type of gearbox also tends to be heavier and more expensive than a manual gearbox. Automatic gearboxes are commonly used in larger and luxury passenger cars as well as in some heavy vehicles including busses.

For rapid shifting in high performance road cars, particularly heavier high power vehicles, dual clutch gearboxes are sometimes used. These gearboxes have intermediate gears on separate shafts and are engaged by one of two clutches. For rapid shifting, the next gear is pre-engaged and the shift is made by swapping clutches. By careful timing of clutch operation, very rapid shifts can be achieved. These gearboxes however are heavy and expensive due to the additional clutch and shafts required and also require complex control systems to operate the clutches and to pick and pre-select the gears. For this reason, they are currently only used in expensive high performance sports cars.

Rapid shifting is achieved in racing cars by use of dog clutch arrangements in a 'crash' gearbox. In a crash gearbox, large angular backlash is used to allow engagement of the dog clutches with relatively large speed differences, therefore reducing the necessity for synchronisation. To operate this type of gearbox requires either a complex control system or a skilled driver. Up shifting can be done without using a clutch but down shifting usually requires double de-clutching and 'heel and toe' driving technique. Crash gearboxes are common on motor cycles but are not often used on road going cars as synchromesh has become the preferred option.

Substantially instantaneous shifts can be performed using shifting mechanisms which pick up drive in the next gear, using forms of dog clutches, before drive is disconnected from the previous gear. A gearbox of this type is described in WO 01/29440 A1 and in WO2004/099654. Previously a selector for a transmission was described in GB1404385 which operates by similar principles. These documents are incorporated herein by reference.

In WO2004/099654, it can be seen that gears are mounted in pairs back to back with a selector hub assembly placed between the pairs. Each gear is engaged to the main shaft by sliding one of the change hubs toward the required gear, which then couples that gear to the shaft through an arrangement of dogs on one side of the gear. To change gear, forward driving dogs are engaged sequentially with reverse driving dogs and the component carrying the forward driving dog from the previously selected gear carries reverse driving dog for the selected gear. This layout therefore requires the various dog components to overlap each other in a complex change hub assembly.

Further, these prior art mechanisms rely on complex fragile interlocking clutch tooth components engaging forward and reverse driving both on one side of a gear on the main shaft. The mechanisms also use springs in the control of the shifting components, which are not preloaded against any stops, and so provided poor control since displacement is required before any actuating force is generated. Further, the required use of springs and sliding components as part of complex rotating assemblies is undesirable as they are prone to variations in function as speed varies (due to forces generated by centripetal accelerations).

The prior art also requires complex additional mechanisms to guard against inappropriate gear selections which would causes shaft locking and potential catastrophic failure.

According to a first aspect of the present invention there is provided a drive member selection mechanism comprising at least one drive member and at least two selector members, wherein the drive member comprises a first and second face, and further comprises, on each face, at least one projection, and the selector members comprise, on at least one face thereof, at least one complementary projection arranged to selectively engage with a projection of a drive member, the arrangement being such that the projection(s) of a selector member and the projection(s) of the first face of a drive member may be drivingly engaged in a first torque connection and the projection(s) of a selector member and the projection(s) of the second face of a drive member may be drivingly engaged in a second torque connection, wherein the second torque connection is opposed to the first torque connection.

The selector members as described herein can therefore act as one-way driving clutches which selectively engage at least on drive member (the term 'selectively' in this context meaning that they can also be disengaged from the drive member). In preferred embodiments, there will be at least two drive members and at least three selector members. In such cases, an advantage of using such a selector member on each side of the drive member (which may be, for example, a gear of a gear box) is that the components can be simple and robust in comparison with the prior art, which use complex interlocking components. As will be appreciated by the skilled person, the selector members may rotate at high speed with a shaft, for example within a gearbox. Therefore, they are preferably simple one piece components, ideally without any spring components, internal sliding components or the like, which are affected by forces caused by centripetal acceleration. They can also be relatively narrow, in particular when compared to the over lapping dog components of the prior art described above. Even where only a single drive member is selectable, for example as part of a driveline for engaging an over drive, a low range in an off-road vehicle or for engaging four wheel drive from two wheel drive, there are advantages over a simple dog clutch (which may be familiar to the person skilled in the art): The use of two engagement members, one for forward drive and one for reverse drive, allows for large backlash while engaging but low backlash when fully engaged, so providing for more reliable, faster engagement and allowing for a bigger speed difference at engagement.

Further, by providing separate selector members, each of which is arranged to drivingly engage with the drive member in one sense of relative torque, only one of the selector members is drivingly engaged with the drive member in any given torque state. This allows the other to be selectively disengaged, which in turn means that another drive member can be selectively engaged and can 'pick up' driving without any interruption torque transmission The drive member selection mechanism may be arranged such that, when drivingly engaged, the complementary projections are positively engaged. This 'positive engagement' could comprise a physically interference preventing disengagement, for example, an 'overhang' portion on at least one projection, such that, when in driving engagement, a selector member may not move away from a drive member. Indeed, in preferred embodiments, the arrangement may be such that, when drivingly engaged, the complementary projections are shaped so as to draw or urge a drivingly engaged selector member and driving member together. This ensures that the driving engagement may only be selectively or deliberately discontinued.

In some examples, the projections and/or selection mechanism is/are arranged such that, where relative rotation between a selector member and a drive member is in the opposite direction to the direction of torque for which driving engagement exists, the drive member and selector member are urged apart. This will prevent inadvertent engagement of the 'one-way driving clutch' selector member in the opposite direction to that which was intended. This could be achieved by having ramp-like projections which have mating faces when in driving engagement but where opposite relative rotation exists, the slopes of the ramps allow the drive member and selection members to ride over one another, in the manner of a ratchet. However, as would be familiar to the skilled person, this need not be the case—for example, the selector member and the drive member could be physically moved apart using some selection mechanism (although this may result in increased complexity when compared to the 'ratchet' arrangement described above). The term 'mating' as used herein refers to any face or component arranged to contact another face/component and does not imply any interlock, shaping or the like.

In some examples, the projections on the drive members are arranged to limit the backlash when changing from a positive torque condition to a negative torque condition. This may mean that the mating, or driving, face of a projection on the first side of the drive member is closely aligned, or aligned at least to within specified tolerances, with the driving face on the second side. Of course, the selector member would also have to be correctly mounted to achieve this and one way of ensuring that the selector members are correctly mounted would be to have a mounting arrangement in which a spline is missing from the selector members and from the shaft on which they are mounted.

The drive member selection mechanism may be arranged such that the selector member which is not drivingly engaged in a given torque condition may be selectively moved away from a drive member. This allows the selector member to be positioned to engage a different drive member, which may be desirable in some embodiments and further means that, in order to deselect a drive member from driving engagement, only one selector member will have to be moved.

In some examples, the drive members and the selector members are arranged on a common axis and are arranged such that their relative axial positions may be changed. Such an arrangement will be familiar to the skilled person from a standard gear box, and may comprise selector member(s) which are slidably mounted on the axis.

The position of at least one axis-mounted selector member may be determined by at least two preloaded springs. The springs are preferably preloaded against fixed stops, therefore positive control of the movement of the selectors is provided, but with the maximum force in the mechanism limited to substantially the pre-load on the springs. This is particularly desirable for selector members which are between two drive members. For the 'end' selector members (or selector members which only ever engage a single drive member), a single spring is likely to be sufficient.

In one embodiment, at least one selector member may be arranged between two drive members and comprise at least one projection on each face thereof, wherein the projection(s) on a first face may be brought into engagement with the projection(s) on one drive member and the projection(s) on a second face may be brought into engagement with the projection(s) on another drive member. Providing such a 'two faced' selector member simplifies the components required in a multi drive member embodiment.

In some examples, three projections may be provided on each face of a drive member and a selector member. While there could be any number of projections, from one per face to many, it will be appreciated that more than one is desirable to spread load, but if the number of projections becomes high, manufacturing becomes more complex and, because they will have to be thinner and smaller, the projections may become weaker. The number of desirable projections may vary according to the application of the drive member selection mechanism.

The mechanism may comprise a shift mechanism arranged to control the position of at least one selector member, comprising a rotating drum portion having circumferential tracks cut therein, where the selector member(s) are mounted such that rotation of the drum member determines the position (for example the axial position) of the selector member.

The drive member selection drum may be arranged to control the position of at least two selector members, and the drive member selection mechanism may further comprise a gate arranged to prevent the selection of more than one drive member in driving engagement at any given time. This prevents 'clashing' selections of gears. In particular, where the drive members provide different gear ratios and each can be in a condition of positive torque where the drive member is acting to drive associated components, or negative torque where the associated component is driving the drive member, the shift mechanism is preferably arranged to prevent the simultaneous engagement by a negative driving selector member of one gear and a positive driving selector member of a higher gear, or the simultaneous selection of a positive driving selector member of one gear and a negative driving selector member of a lower gear.

The selector members may be mounted in association with tracks, or cut-outs, formed in the drums. Preferably, the tracks have curve(s) formed therein such the path formed by the track varies axially and the tracks are 'symmetrical' on both sides of the drum, and the shift mechanism comprises at least two shift arms in association with each drum, each arranged in association with one side of a drum, and to engage with the track formed thereon. This allows the selector member to flex slightly and accommodate slight misalignments. The nature of the 'symmetry' is such that the form or pattern (e.g. of curve(s) in the track is repeated at 180 degrees displacement around the drum. The symmetrical track allows the shift mechanism to act substantially axially on the selector members (as both shift arms will experience the same axial displacement under the action of the track).

In embodiments with a plurality of drums, the drums may be substantially identical, and may be mounted with a relative rotational displacement. Using identical parts is desirable because it reduces manufacturing complexity.

The drum(s) may be mounted on a shift shaft, wherein each drum is urged towards a rest position by at least two resilient members acting along the axis of the shift shaft. The resilient members ensure that the position of the selector member is held securely but allow movement in the case of forces above a threshold. In one example, the resilient members are springs mounted inside the shift shaft although other arrangements will occur to the skilled person.

In a second aspect of the invention there is provided a selector member for selecting a drive member comprising a substantially annular body having a first face and a second face, wherein at least one projection is arranged on each face, the projection comprising a ramped form having a base in contact with the annular body, a sloping surface and a mating surface, and arranged such that the sloping surface on the first face inclines in the opposite direction to the sloping surface on the second face. The mating surface (it will be recalled that the term 'mating; implies only that the face may be brought into contact with another face) may be formed such that it extends at least partially beyond the base so as to create an overhang. For example, therefore, the projection may have the form of a sawtooth, or an obtuse scalene triangle. The arrangement is preferably similar to a ratchet tooth—arranged for positive engagement in one sense only. Therefore, to express the invention in an alternative way, a drive member is provided which comprises a substantially annular body having a first face and a second face, wherein at least one projection is arranged on each face, the projection comprising a ramped form having a base in contact with the annular body, a sloping surface and a mating surface, and arranged such that the mating surface(s) on the first face lead the projection(s) in a first sense of rotation, and that the mating surface(s) on the second face lead the projection(s) in a second, opposite sense of rotation.

The selector member may indeed be arranged to act as a selector member in a drive member selection mechanism according to the first aspect of the invention. The sloped ramp allows a drive member and selector member to ride over one another where there is relative rotation and, where provided, the 'overhang' prevents unintended separation during driving engagement, and indeed urges close engagement during driving engagement, in a manner similar to a ratchet arrangement.

The selector member may additionally comprise means for engaging with a shaft, for example a drive shaft. Such means may comprise teeth arranged about the interior ring of the annulus, arranged to engage with complementary teeth on a shaft, or other engagement means.

The selector member may have any of the features described in relation to the first aspect of the invention above. Equally, the selector member of the first aspect of the invention may have any of the features described in relation to the second aspect of the invention.

According to a third aspect of the invention, there is provided a gearbox comprising at least two gears mounted on a shaft and at least three selector members slidably mounted on the shaft, and rotatively coupled thereto, wherein the gears are substantially annular and comprise a first and second face, and further comprise, on each face, at least one projection, and the selector members are substantially annular and comprise, on at least one face thereof, at least one complementary projection arranged to selectively engage with a projection of a gear, the arrangement being such that projections of a selector member and of the first face of a gear may be drivingly engaged in a positive torque connection and the projections of a selector member and of the second face of a gear may be drivingly engaged in a negative torque connection.

The gearbox may further comprise a simple gear selection mechanism using spring loaded selector drums and a simple means to block inappropriate gear selections. The simplicity of a gearbox according to the present invention therefore provides a low cost light weight, high efficiency, rapid shifting transmission for use in any vehicle type.

The spring mechanisms required to control shifting are preferably pre-loaded to give positive control of the movement of the components (avoiding the poor control seen in prior art systems which used non preloaded leaf springs for the same purpose).

The preferred features may be combined as appropriate, as would be apparent to a skilled person, and may be combined with any of the aspects of the invention. The shift mechanism herein described may be used with other drive member selection mechanisms.

In order to show how the invention may be carried into effect, embodiments of the invention are now described below by way of example only and with reference to the accompanying Figures in which.

Figure 1:
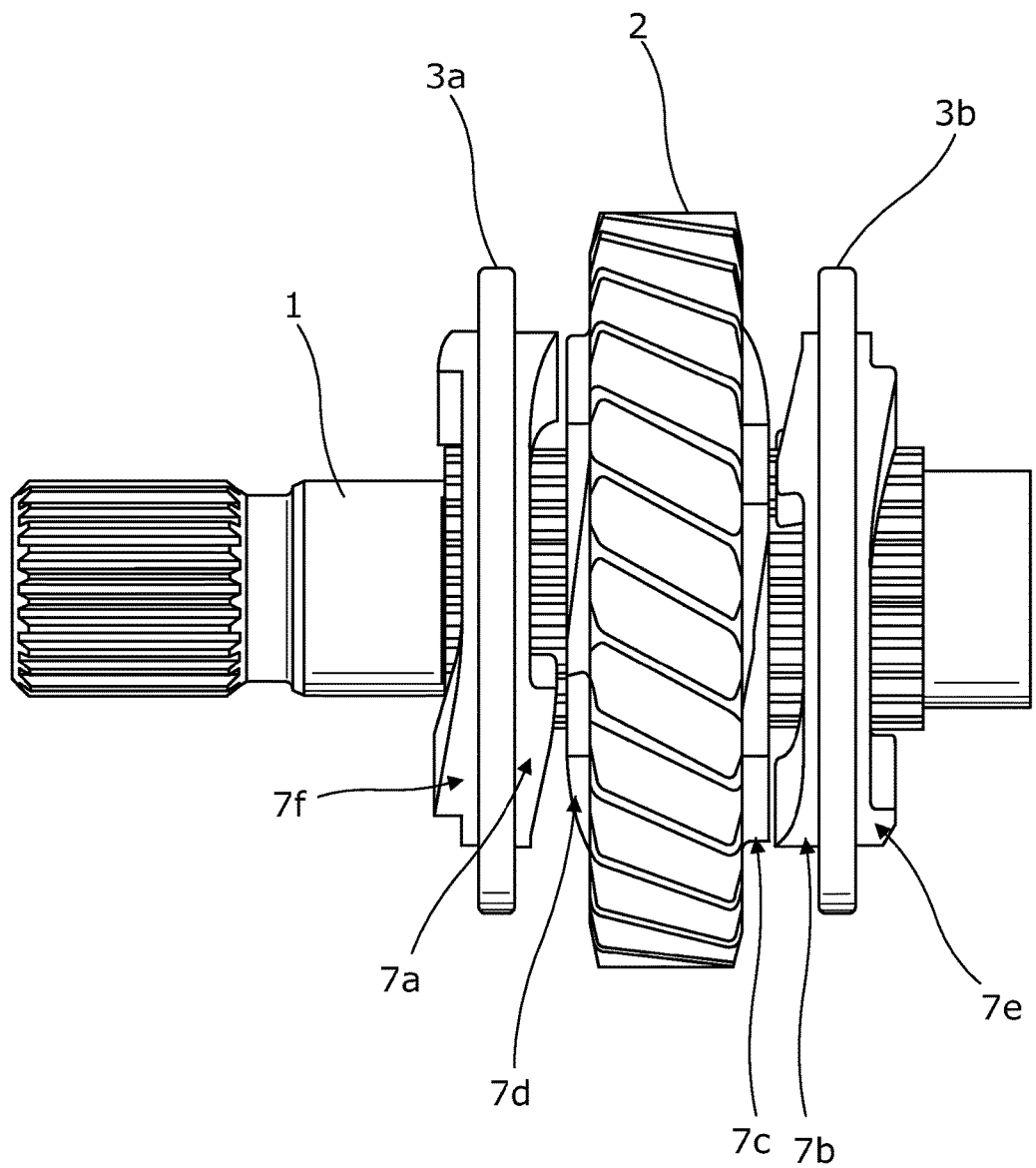
FIG. 1 shows the assembly of the main components of an embodiment of the invention in a fully disengaged state.

FIG. 1 shows the assembly of the main components of the invention in a fully disengaged state. The shaft 1 passes through a first selector member, herein referred to as a 'dog hub' 3a, a drive member in the form of a gear 2 and a second dog hub 3b. The gear 2 is mounted on the shaft by a low friction bearing (not visible), being, in this embodiment, a combination of plain thrust washers and a needle roller bearing, so that it is axially and radially located on the shaft 1 but free to rotate relative to the shaft 1.

In this embodiment the drive member is a gear 2, although in other embodiments the drive member may be any part of a drive mechanism which is required to be selectively rotatively engaged to a shaft, for example a roller chain sprocket or a belt drive pulley.

Figure 2:
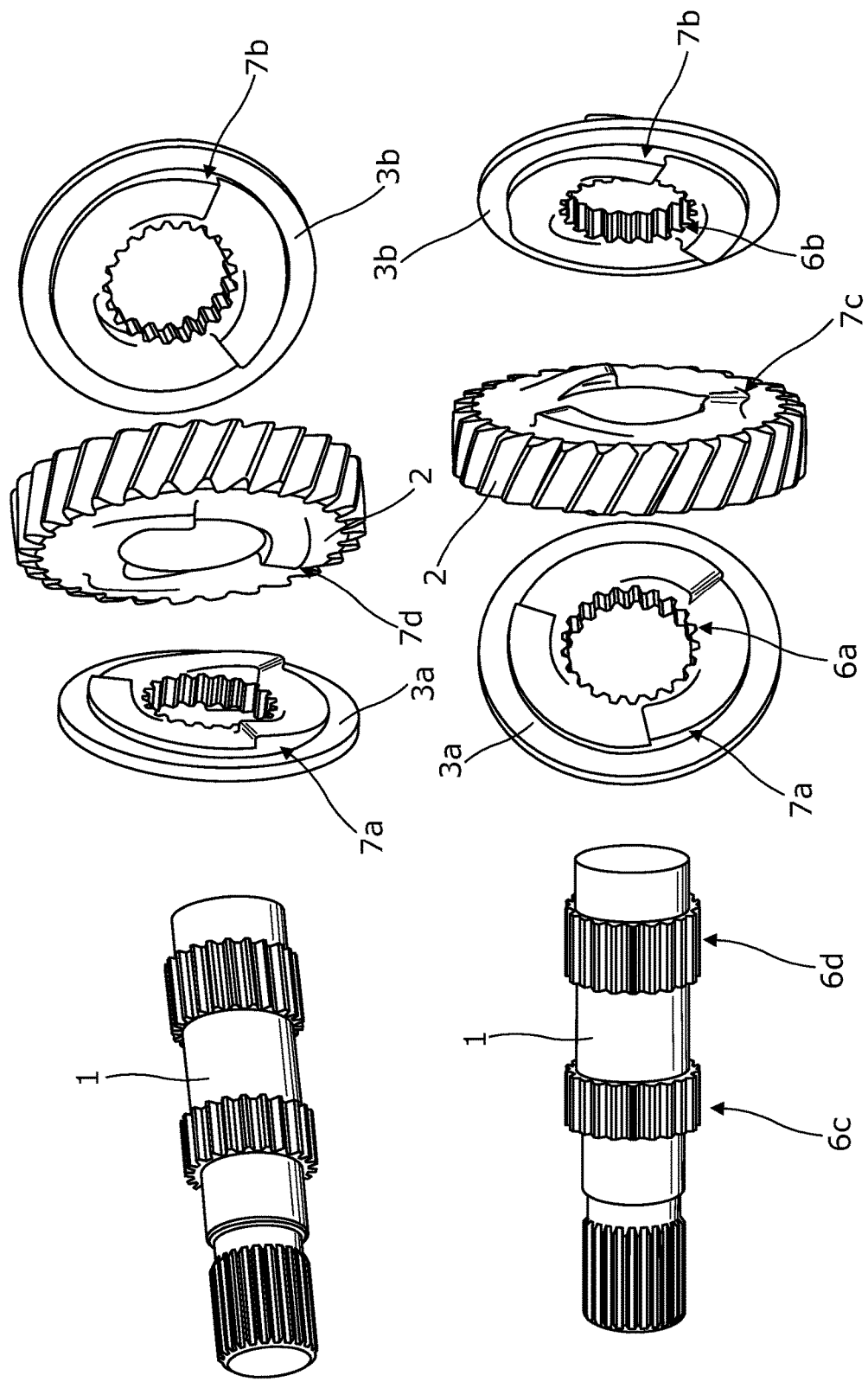
FIG. 2 is an exploded view of the main components of the embodiment of FIG. 1.
Figure 3:
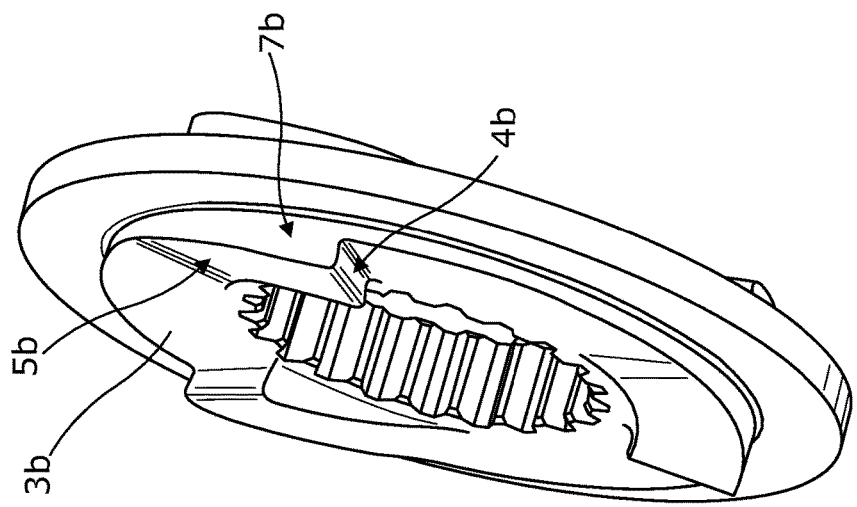
FIG. 3 shows a detail view of the dog features on a dog hub 3b and the corresponding dog features on the gear 2.
Figure 3:
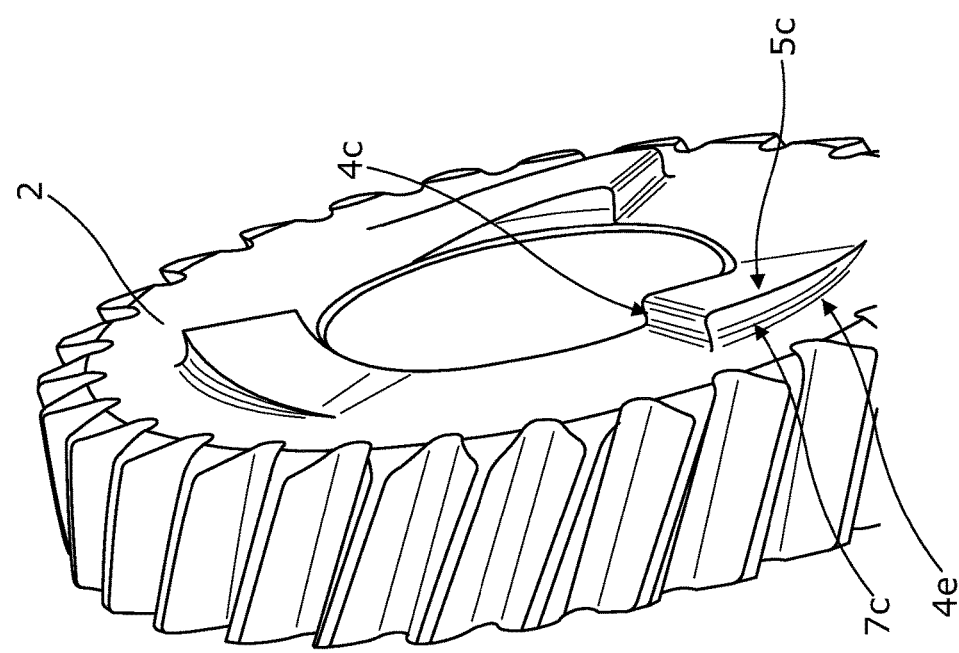

As can be seen with reference to FIGS. 1 to 3 in particular, dog hubs 3 are substantially annular having two faces and a means for engaging with the shaft 1, in this example, a toothed inner ring 6a, 6b. They also comprise a plurality (in this example, 3) of projections or engagement 'dog' features 7a, 7b, 7f, 7e, arranged on each face thereof. The gear 2 is also annular, comprising a toothed outer surface and two opposed faces. The gear further comprises a plurality (in this example 3 on each face) of engagement 'dog' features 7c, 7d. The dog features 7 of the hubs 3b are shaped to engage the dog features 7 of the gear 2, as will be described in greater detail below.

In the disengaged state of FIG. 1, the two dog hubs 3a and 3b are axially displaced away from the gear 2 so that the dog features 7a, 7b on the hubs are disengaged from the corresponding dog features 7c, 7d on the gear 2. It will be noted that the dog features 7e, and 7f on the second face (as illustrated, the outer faces) of two dog hubs 3a, 3b do not engage with the gear 2 shown in FIGS. 1-5, but are provided to allow for engagement with other gears which may be mounted on the main shaft (see FIG. 6 onwards).

FIG. 2 is "an exploded view" of the main components of an embodiment of the invention, in which the lower half of the Figure shows the same components as the upper half of the Figure but at a different viewing angle to reveal the dog features 7 on the second side of the gear 2. In the upper half of FIG. 2 the dog features 7a on the dog hub 3a and the corresponding dog features 7d on one side of the gear 2 are visible. In the lower half of FIG. 2 the dog features 7b on the dog hub 3b and the corresponding dog features 7c on the other side of the gear 2 are visible.

In this embodiment as illustrated in the accompanying illustrations, each face of each dog hub 3 and each face of each gear 2 have three such projections provided by the dog features 7 substantially evenly distributed around the axis of the shaft. However, the use of any number of similar dog features 7 per face is possible within the scope of the invention. For example if higher load capacity was required more dog features 7 could be used, or for simplicity, or to achieve engagement with higher speed difference, fewer dog features 7 could be used. However, providing three dog features 7 per face provides for substantially even load sharing between dog features 7 and gives a self centring action when the dog features 7 are transmitting torque. If greater than three dog features 7 are used, high accuracy of manufacture is required to ensure that any errors in dog feature position are less than the deflection of the dog features 7 under load if load sharing over more than three dog features 7 is to be achieved. Also the use of three dog features 7 per face provides a large angular gap between features to allow positive engagement with a high relative speed between a dog hub 3 and gear 2.

The shaft 1 comprises a plurality of male spline teeth portions 6c, 6d (the number of which corresponds to the number of dog hubs 3 in the assembly), and the inner ring of the dog hubs 3 carry corresponding female spline teeth 6a, 6b. These mating splines 6c, 6d and 6a, 6b are toleranced to engage with a clearance fit. The male spline teeth are wider (i.e. extend further axially along the shaft 1) than the female spline teeth such that, once arranged on the shaft 1, the dog hubs 3a, 3b are radially and rotatively connected to the shaft 1 when aligned with the male spline teeth 6c, 6d but are free to move axially, while maintaining this connection to the shaft 1. This allows the dog features 7a, 7b of the dog hubs 3a, 3b to move in and out of engagement with the dog features 7c, 7d of the gear 2 while still being driven by the shaft 1.

FIG. 3 shows a detail view of the dog features 7a, 7b on a dog hub 3 and the corresponding dog features 7c, 7d on the gear 2. Each of the dog features 7a-d consist of a ramp-like block projecting above the side face of the gear 2 or dog hub 3. Each dog feature 7a-d rises from a base 4e which is in the same plane as the face of the dog hub 3 and comprises a sloping surface 5b, 5c and a 'mating' or contacting surface 4c, 4b which is angled away from the axis of the shaft 1 to provide positive engagement, or a physical interlock, between a feature on a hub 3 and a feature on the gear 2 when one is rotatively driving the other.

Furthermore, taking the example of a single hub, when the dog hub 3b is moved towards the gear 2 by action of a shifting mechanism (described herein below), the leading edges 4b of the dog features 7b of the dog hub 3b will become engaged with the leading edges 4c of the dog features 7c of the gear 2 and provide a means of transmitting torque between the two components. The contact forces between the mating faces 4b, 4c, resulting from the transmission of torque will tend (because of the angle of the faces 4b, 4c) to pull the dog hub 3b toward the gear 2, so ensuring there is no tendency for the mechanism to fall out of engagement when transmitting torque.

The sloping surfaces 5b, 5c of the dog features 7b, 7c provide a trailing edge which ramps at a relatively shallow angle. When there is relative rotation between the dog hub 3b and the gear 2 in the other sense, the shallow sloping surface 5b, 5c will easily ride up each other so forcing the dog hub 3b away from the gear 2 and so disengaging any connection between the two components. This 'ramped' form of the dog features 7a-f therefore provides for positive engagement and transmission of torque in one sense of relative rotation and for disengagement of the dog features 7a-f and no transmission of torque in the other sense of relative rotation.

It should be noted that the dog features 7 on one side of the gear 2 and the corresponding dog features 7 on the dog hub 3a, as visible in the upper half of FIG. 2, are adapted to give positive engagement and driving connection between the dog hub 3a and the gear 2 in one sense of relative rotation and the dog features 7 on the other side of the gear 2 and the corresponding dog features 7 on the dog hub 3b are adapted to give positive engagement and driving connection in the other sense of relative rotation. Therefore when both dog hubs 3 are moved toward the gear 2 by action of a shifting mechanism (described later), there exists positive driving engagement in both senses of relative rotation between the gear 2 and the dog hubs 3a, 3b, and since both the dog hubs 3a, 3b are connected to the shaft by splines, to the shaft 1.

Figure 4:
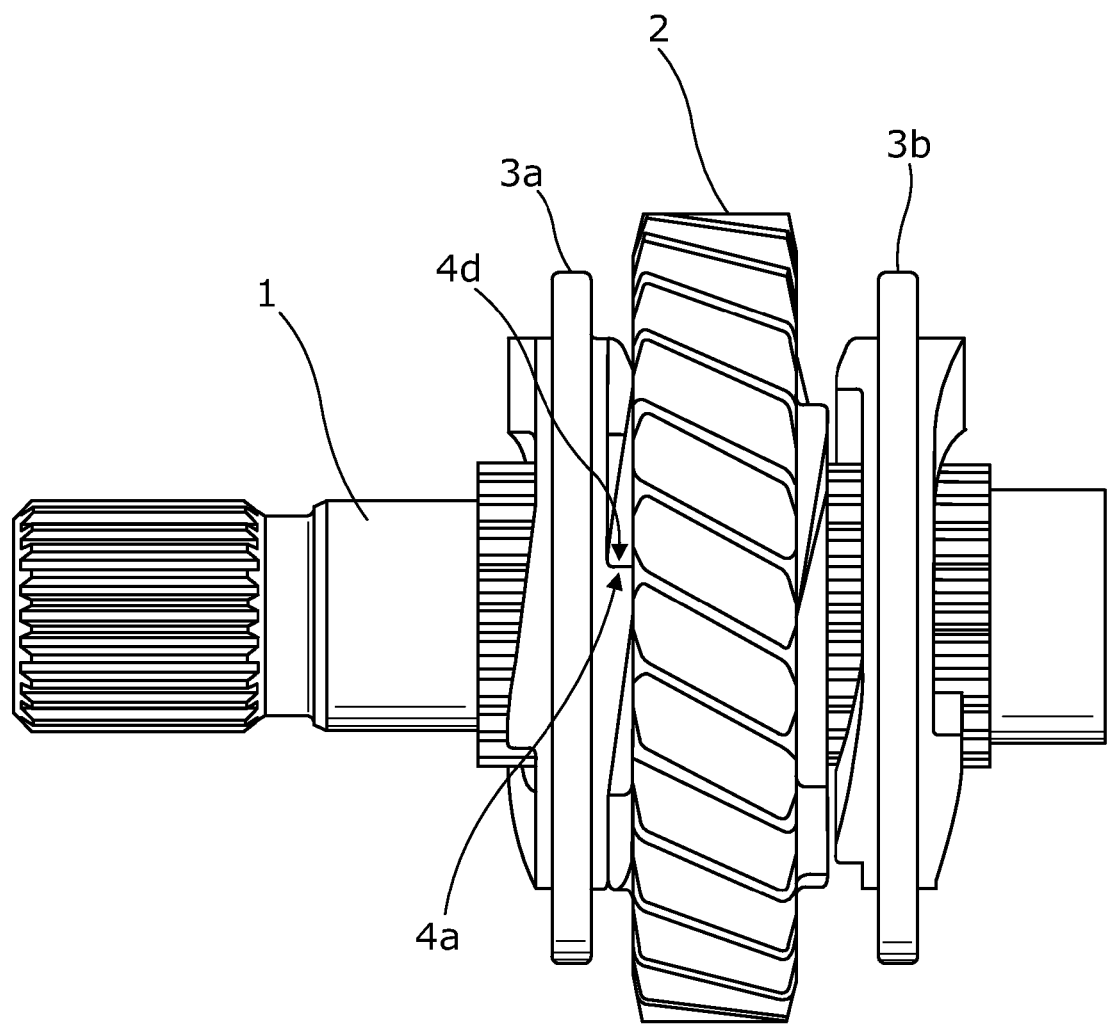
FIG. 4 shows the assembly of the main components of the embodiment of FIG. 1 in a semi engaged state.

FIG. 4 shows the assembly of the main components of the invention in a 'semi engaged' state. Dog hub 3a is in contact with gear 2 and the mating surfaces 4a, 4d of the dog features 7 are in contact with each other. Dog hub 3b is axially displaced away from the gear 2 so that there is a clearance between the tips of the dog feature projections. In this state therefore the gear 2 is rotatively connected to the shaft 1 for relative rotation (e.g. positive torque/forward drive) in one sense but not in the other sense (e.g. negative torque/reverse drive).

Figure 5:
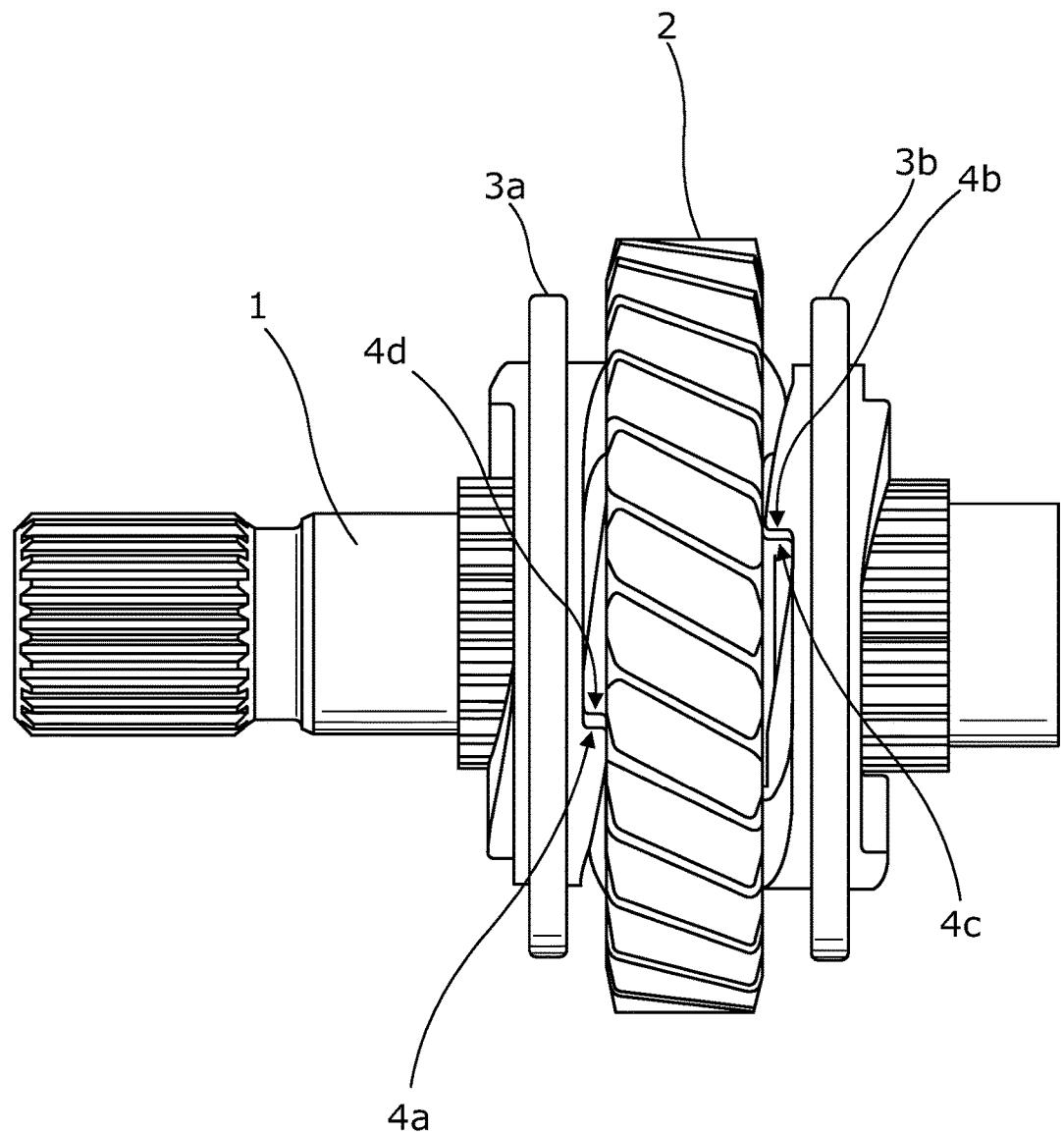
FIG. 5 shows the assembly of the main components of the embodiment of FIG. 1 in a fully engaged state.

FIG. 5 shows the assembly of the main components of the invention in a fully engaged state. Both dog hubs 3a, 3b are in contact with the gear 2. The leading edges of the dog features 7a, 7b on the dog hubs 3 are in engagement with the corresponding leading edges of dog features 7c, 7d on the gear 2. In this state therefore the gear 2 is rotatively connected to the shaft 1 for relative rotation and drive in both senses. It should be noted that the assembly of the dog hubs 3a, 3b onto the shaft 1 is chosen so that in this state of full engagement only a small tangential clearance exists between the leading edges of the dog features 7. This small tangential clearance ensures that only a small amount of backlash is present between the gear 2 and the shaft 1 in this fully engaged state. For road vehicles, especially passenger vehicles, low backlash is desirable for passenger comfort, to minimise torsional shocks in the driveline each time a torque reversal occurs, for example when the driver lifts off the accelerator pedal. A minimal amount of clearance is provided between the dogs to allow for engagement of the dog features 7a-f having angled leading edges (as shown in this embodiment) to provide positive engagement, and to allow for manufacturing tolerances.

Figure 6:
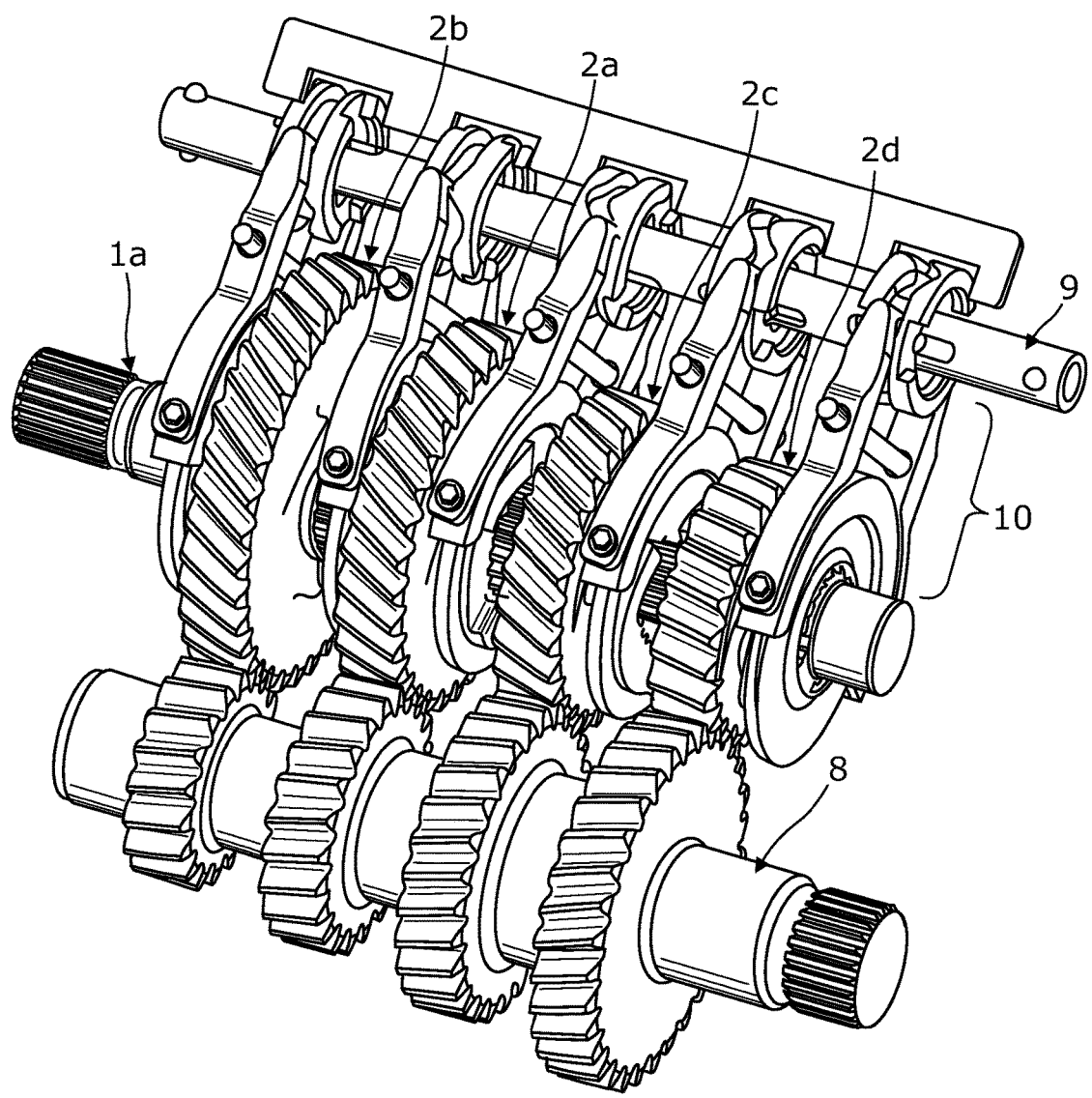
FIG. 6 is an overall view of a 4-ratio gearbox including a shifting mechanism according to an embodiment of the invention.

FIG. 6 is an overall view of a 4-ratio gearbox including a shifting mechanism according to the invention. The main shaft 1a carries four gears 2a, 2b, 2c, 2d, of varying diameters each meshing with a lay gear 8, the lay gear 8 having four meshing gears 2 formed along its length. In this embodiment of the invention, the main shaft 1a is the input and the lay gear 8 is the output. When one of the gears 2a-d is selected, by rotatively connecting it to the main shaft using the dog hubs 3, there is a driving connection between the input shaft 1a and the lay gear 8, the relative speeds of the input shaft 1a to the lay gear 8 being the ratio of the numbers of teeth on the selected gear 2 and the meshing gear on the lay gear 8. The diameters and tooth numbers on each of the gears are chosen to achieve substantially similar ratio differences between adjacent gear pairs so providing for similar step changes in input speed as shifts are made.

The shift mechanism comprises a shift shaft 9, connected to a number of shift mechanisms 10. In this four speed example embodiment there are five such shift mechanisms, one for each dog hub 3. The dog hubs 3 between each of the gears 2 on the main shaft 1a have dog features 7 formed on both sides, as shown in FIG. 1, to engage with either of the adjacent gears 2. The dog hubs 3 on each end of the main shaft 1a shown in this illustration have dog features 7 on only one side to engage with the adjacent gear 2. However, for convenience, to minimise the number of different components used in a given gearbox, and to guard against incorrect assembly, the same 'two sided' dog hub 3 as used between gears 2 could be used at the end of the main shaft 1a, with its outer dog feature 7 being redundant.

The main shaft 1a, the lay gear 8 and the shift shaft 9 are supported in a casing on suitable bearings, one bearing at each end of each shaft. The casing and bearings are not shown in this illustration but suitable bearings would be familiar to the person skilled in the art.

Figure 7:
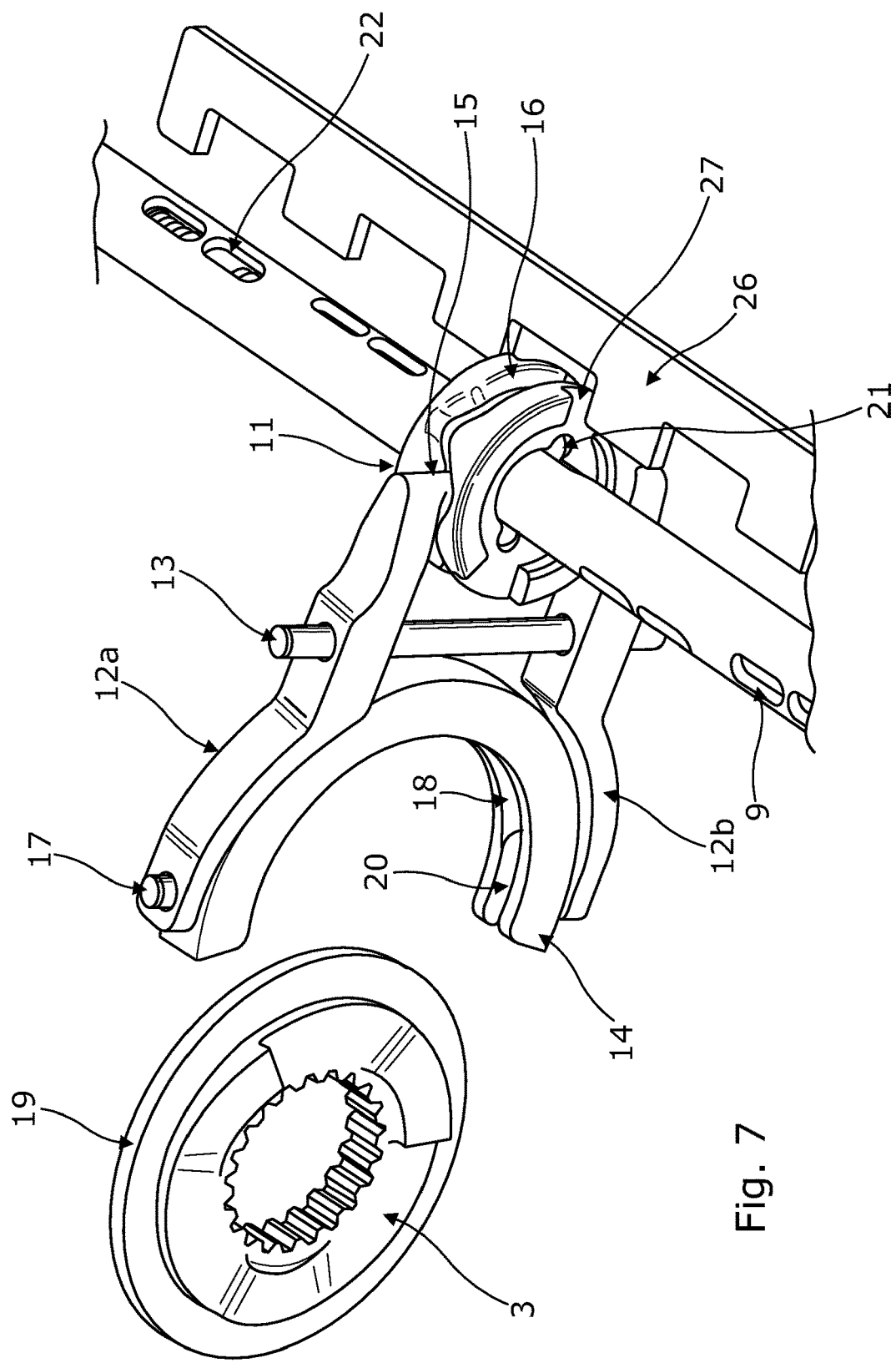
FIG. 7 shows the components of the shifting mechanism of FIG. 6 with one dog hub shown in an exploded view for reference.

FIG. 7 shows the components of the shifting mechanism coupled to one dog hub 3 shown in an exploded view. A selector drum 11 is mounted on the shift shaft 9. Shift arms 12a, 12b are provided, one mounted above and one mounted below each selector drum 11, and located into the gearbox case (not illustrated) by a pivot pin 13. The pivot pin 13 is located in holes in the gearbox case so as to be stationary with the case. On one end of each pivot arm 12a, 12b there is a pin 15, which engages with a track 16 cut in the outer diameter of the selector drum 11 (see also FIG. 9 for views of the tracks 16). As can perhaps be better appreciated in the assembled shifting mechanism shown in FIG. 9, the axial position of the track 16 varies around the circumference of the drum 11. As the drum 11, is rotated with the shift shaft 9, the pin 15 therefore is moved axially and the shift arms 12a-b, pivot around the pivot pin 13. On the other end of the shift arms 12a, 12b is mounted the shift thrust ring 14. Pins 17 formed on the outside of the shift thrust ring 14 fit through holes in the ends of the shift arms 12a, 12b so that the shift thrust ring 14 can pivot on the end of the arms 12a, 12b. The shift thrust ring 14 is formed to have a groove 18 around its inside diameter which fits over a ridge 19 formed on the outside diameter of the dog hub 3. When the shift thrust ring 14 is fitted over the dog hub 3 there exists a small axial clearance between the inside of the groove 18 and the profile of the ridge 19 so that the dog hub 3 can freely rotate inside the ring 14, but if the ring 14 is axially displaced the dog hub 3 is also axially displaced. Specifically, when the shift arms 12a, 12b pivot by the action of the selector drum 11 being rotated, the shift thrust ring 14 therefore is axially displaced and with it the dog hub 3.

In the embodiment illustrated, the gearbox is assumed to be partially filled with oil for cooling and lubrication of the gears and bearings. This oil therefore will provide lubrication between the inside of the groove 18 and the ridge 19 so forming a thrust bearing capable of displacing the dog hub 3 for the purpose of gear selection when the gearbox is rotating at high speed. As will be familiar to the skilled person, some of the inside surface of the groove 18 may be cut back to leave raised thrust pads to reduce the area of contact between the groove 18 and the ridge 19 to reduce friction and aid lubrication.

In other embodiments the thrust bearing between the shift thrust ring 14 and the dog hub 3 may be any other suitable form of thrust bearing, for example a needle roller thrust bearing, a ball bearing or a spherical roller bearing. As will be familiar to the skilled person, any such bearing is capable of causing an axial displacement of the dog hub 3.

Figure 8:
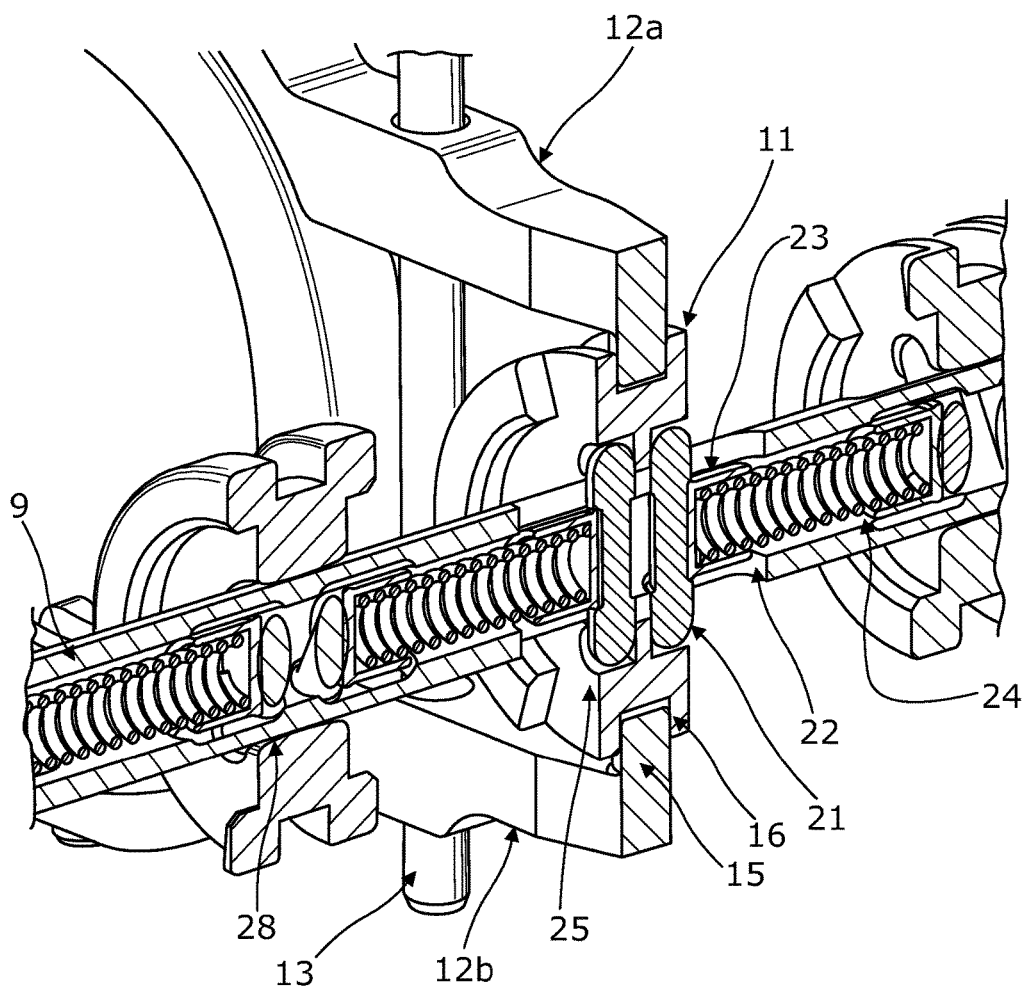
FIG. 8 is a section view through the axis of a shift shaft 9, showing a spring connection between the shift shaft and selector drum.

FIG. 8 is a section view through the axis of the shift shaft 9 revealing the spring connection between the shift shaft 9 and the selector drum 11. The shift shaft 9 comprises a tube with a series of slots 22 (see also FIG. 9) which are cut through the tube wall. Pins 21, one each side of each selector drum 11, fit through the slots 22 and engage with cut out tracks 25 on each side of the selector drum 11. Springs 24 are fitted inside the shift shaft 9 between each selector drum 11 with spring cups 23 on each end of each spring 24, the spring cups 23 resting on the pins 21. The springs 24 are selected to be longer than the gap between each spring cup 23 so that they are partially compressed on assembly and so provide a defined preload to the pins 21. The middle portion of each pin 21, on which the spring cups 23 rest, is a smaller diameter so that there is a step each side of the spring cup 23 to retain the pin 21 in position in the shift shaft 9 even if the pin 21 is revealed by axial displacement of the selector drum 11. It should be noted that the gap between the ends of the slots 22 in the shift shaft 9 and the axial thickness of the material between the cut-out tracks 25 in the selector drum 11 are substantially the same, so that preload on the pins 21 from the springs 24 holds the pins 21 in contact with the ends of the slots 22 and the selector drum 11 is positively located between the pins 21 along the axis of the shift shaft 9. The pins 21 passing through the slots 22 and into the cut-outs 25 in the selector drums 11 provide a rotary connection between the shift shaft 9 and the drums 11 but allow axial displacement within the length of the slot 22. If a force acts to push the sector drums 11 along the shift shaft 9 which exceeds the preload in the springs 24 then the pins 21 will move along the slot 22, further compressing the spring 24, allowing axial displacement of the selector drum 11 while maintaining rotary connection. The selector drums 11 therefore are positively located along the length of the shift shaft 9 so can provide positive control over the shift arms and the movement of the dog hubs 3 along the shaft 1, but if a load defined by the preload in the springs 24 is exceeded, then the selector drums 11 may be axially displaced along the shift shaft 9.

It should be noted that, in this example, each selector drum 11 is fitted over the shift shaft 9 with a clearance fit to allow axial displacement and additionally the internal bore 28 of the selector drum 11 is of a double conical form to allow for some misalignment of the drum 11 on the shaft 9. Additionally it should be noted that the two shift arms 12a and 12b in the example embodiment can pivot independently of one another. This provides for an amount of flexibility in the mechanism to allow for variation in the geometry of each component due to manufacturing tolerance and the like. The dog hub 3 is then allowed to contact the gear 2 without being overly constrained by the shift mechanism. It may also be noted that the use of a selector drum 11 with two pins 15 engaging in its track, one directly opposite the other, ensures that the resulting forces from the shift arms 12 on the selector drum 11 act substantially at the centre line of the shaft 9 on the spring 24. This configuration therefore resists any tendency for the drum 11 to bind on the shift shaft 9 if it is axially displaced by the action of the dog features 7 on the dog hub 3 engaging with dog features 7 on the gear 2.

It may be noted, that, in this example, for cost effective manufacture by minimising the number of different components used and preventing incorrect assembly, each of the selector drums 11 fitted to the shift shaft 9 are identical components, and that their angular and axial positions are determined by the location of the various slots 22 cut through the shift shaft 9. Also the selector drums 11 are designed to be symmetrical so that they do not need to be installed in any particular orientation to function correctly. However, this need not be the case in all examples.

FIG. 7 shows a selector drum 11 fitted to the shift shaft 9. Adjacent to the drum 11 is the gate 26. The gate 26 is fixed to the case of the gearbox (not shown), and has a series of slots through which pass the edges of each selector drum 11. There exists a clearance between the drums 11 and the slots in the gates 26 so that in normal operation the drums 11 rotate freely without contacting the gate 26. In the end faces of each drum 11 there are cut-outs 27 adjacent to the slot in the gate 26. At certain angular positions the cut-out 27 of a drum 11 aligns with the gate 26 so that if the selector drum 11 is displaced axially along the shift shaft 9 then the cut-out 27 engages with the gate 26 and the rotation of the drum 11, and the whole shift shaft 9, is limited to the angular extent of the cut-out. This provides a mechanism to block certain combinations of dog hub 3 movement which could otherwise damage the gearbox as now described. In other angular positions, the cut-out 27 does not align with the gate 26 and so the axial movement of the drum 11 is limited by the gate 26.

It should be noted that the cut-outs 27 in the selector drum 11 are aligned with the gate 26 when the pin 15 on the shift arms 12 are in the portion of the track 16 which cause axial displacement of the pin and so moves the shift arms 12 and moves the dog hubs 3 into engagement with the gears 2. The remaining portion of the tracks 16 in the selector drums 11 provide no axial displacement, therefore when the pins 15 are in this portion of the track the dog hubs 3 are held substantially at mid position between gears 2 and so are not in engagement with the gear 2, and cut-outs 27 do not align with the gate 26 so axial displacement of the drum 11 is limited to the clearance between the drum edges and the gate 26.

Figure 9:
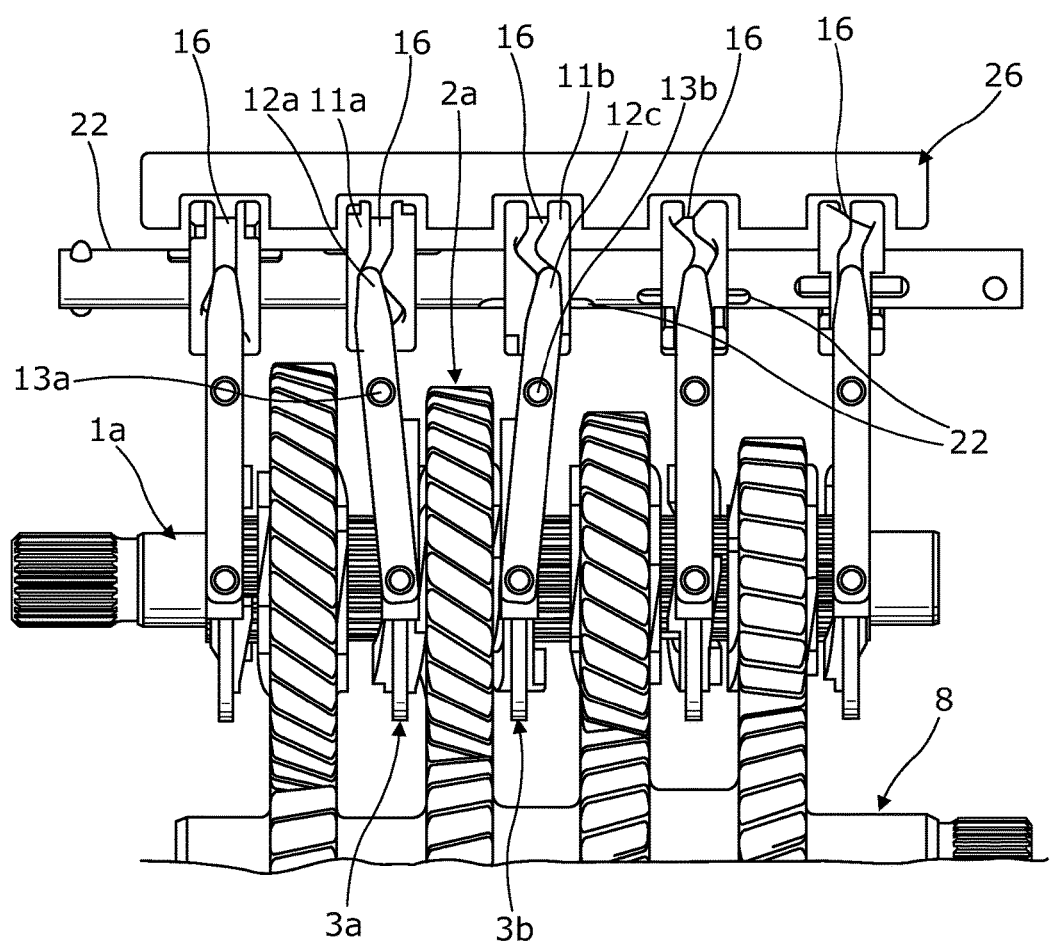
FIG. 9 is a plan view of a 4-ratio gearbox including a shifting mechanism according to an embodiment of the invention shown with one ratio fully engaged.

This shift mechanism could also be used in other drive member selection assemblies FIG. 9 is a plan view of a 4-ratio gearbox including a shifting mechanism according to the invention, shown with one gear 2 fully engaged. Specifically, dog hubs 3a, and 3b are engaged with gear 2a. The shift shaft 9 is in an angular position where the pins 15a, 15b in tracks 16a and 16b in the selector drums 11a and 11 b are displaced axially away from gear 2a so that shift arms 12a and 12c are pivoted around the pivot pins 13a, 13b to hold the dog hubs 3 in engagement with the gear 2a.

The preferred example embodiment of the invention as illustrated is configured for use in a conventional engine drive vehicle. For this application the gearbox is assembled so that up shifts are performed with substantially positive torque transmission, (i.e. when the sense of torque at the input shaft is the same as the sense of rotation), and down shifts are performed with substantially negative torque (when the sense of torque at the input shaft is opposite to the sense of rotation). Up shifts are transitions from one gear ratio to another which result in a reduction in input shaft speed for a constant output shaft speed and are normally performed sequentially as the vehicle accelerates. Down shifts are transitions from one gear ratio to another which result in an increase in input shaft speed for a constant output shaft speed and are normally performed sequentially as the vehicle decelerates.

In FIG. 9 it should be noted that the dog features 7 on the right hand faces of each gear 2 and the meshing dog features 7 on the dog hub 3 provide positive driving torque connection between the gear 2 and the shaft and that dog features 7 on the left hand side of each gear 2 provide negative driving torque connection between the gear 2 and the shaft.

When the gearbox is transmitting positive torque therefore the dog hub 3b on the right hand side of gear 2a, as illustrated in FIG. 9, is transmitting torque from the input shaft to the gear 2, the gear 2 then meshing with the lay gear drives the output. It should be noted that when transmitting torque, due to the angled faces of the dog features 7 and the friction in the spline connection between the dog hub 3 and the shaft 1, the dog hub 3 may not readily be moved away form the gear 2 to disengage the gear 2 from the shaft. The preload in the springs 24 on the shift shaft 9 is limited to ensure that disengagement can only occur at relatively low torque levels.

As shown in the figure, however, the dog hub 3a, however, when positive torque is being transmitted, is not loaded and so is free to move away from gear 2a if so urged by the shift mechanism.

Figure 10:
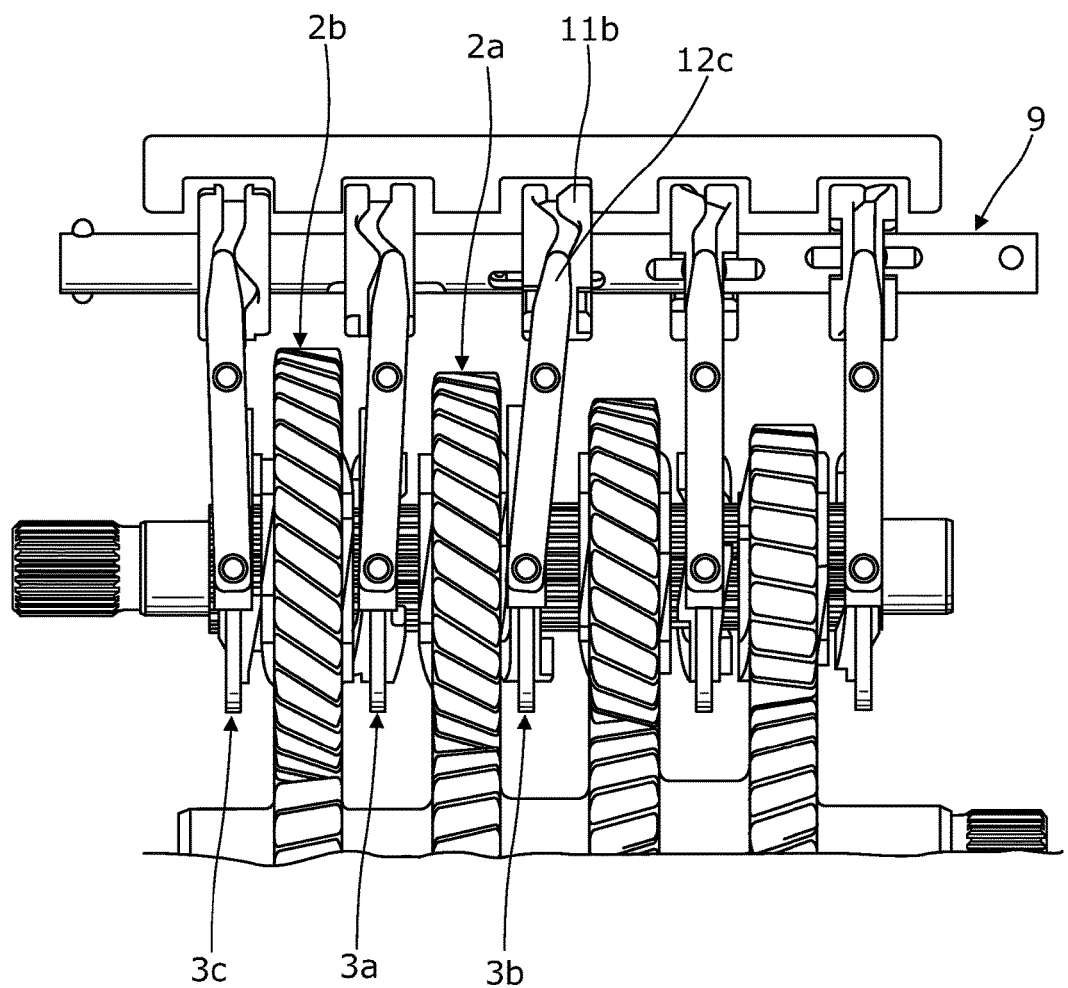
FIG. 10 is a plan view of a 4-ratio gearbox including a shifting mechanism according to the invention shown in the process of making an up shift from third to fourth speed.

FIG. 10 is a plan view of a 4-ratio gearbox including a shifting mechanism according to the invention shown in the process of making an up shift from third to fourth speed. The shift shaft 9 has been rotated fully to the fourth gear position. The dog hub 3b is transmitting torque from the input shaft to the gear 2a and so is held in engagement. The associated selector drum 11b is displaced along the shift shaft 9. Another dog hub 3c is being moved towards the gear 2b by action of the spring 24 in the shift shaft 9. Since the third gear 2a is still engaged, the gear 2b is rotating slower than the shaft 1a and the dog hubs 3, so the ramped faces of the dog features 7 ride up one another to push the dog hub 3 away from the gear 2b without engagement. The dog hub 3 is allowed to move away from the gear 2b by compressing the spring 24 inside the shift shaft 9. A further dog hub 3a is being moved toward the fourth gear 2b by action of the spring 24 inside the shift shaft 9. The dog features 7 between the fourth gear 2b and the dog hub 3a are positive driving and the main shaft is rotating faster than the fourth gear therefore as the dog hub 3 is moved axially towards the gear the leading faces of the dog features 7 contact and positive drive is achieved between the shaft and the gear 2. As drive is picked up by dog hub 3a, the load on dog hub 3b is relaxed and the gear 2a is then rotating faster than the main shaft 1. The ramps on the dog features 7 then will cause the dog hub 3b to be pushed away from the gear 2a and also the spring 24 in the shift shaft 9 moves the selector drum 11 back to the neutral position.

Once the dog hub 3a engages with gear 2b the main shaft rotates at the same speed as the gear 2b therefore dog hub 3c is able to move full into engagement with gear 2b. Fourth gear is then full engaged and the shifting process is complete.

It should be noted that the shift is achieved by the axial movement of an intermediate dog hub 3, which is between the two gears 2 which are engaged or disengaged. This dog hub 3 is free to move to initiate the shift since it is the negative driving component for the gear 2 being disengaged, and it makes the engagement because it is the positive driving component for the gear 2 which is to be engaged. Once engagement is made by the intermediate dog hub 3 the positive driving dog hub 3 from the earlier selected gear 2 is released and synchronisation is achieved to allow the negative driving dog hub 3 on the gear 2 being engaged to move fully into engagement.

Expressed more generally, if a positive driving selector member is moved toward a drive member of a higher gear, the leading edges of the projections on each are moving towards each other, because of the different gear ratio. When the leading edges contact, drive is picked up by the higher gear drive member and the selector for the lower gear drive member becomes disengaged. Because drive from the lower gear is only disengaged after the drive is picked up by the higher gear, no interruption in torque transmission occurs and the shift may be substantially instantaneous.

Down shifts are completed by the same mechanism of movement of the intermediate gear 2 while negative torque is being transmitted, in the case of a conventional engine driven vehicle this would be when the diver has lifted off the accelerator pedal.

If a down shift is required when positive driving torque is demanded for example if the vehicle is climbing a slope and vehicle speed is falling, a different shifting process is employed. While the gearbox is transmitting positive torque, a single down shift can be pre-selected by rotating the shift shaft 9 to the next lower gear position. The intermediate dog hub 3 is not free to move since it is the positive driving engagement between the gear 2 and the input shaft. The selector drum 11 for the intermediate gear 2 therefore is axially displaced along the shift shaft 9 and the spring 24 inside the shift shaft 9 is further compressed. The negative driving dog hub 3 for the lower gear to be engaged is brought into contact with the gear 2 but it is rotating slower than the gear 2 so it does not engage. To complete the shift, in this example, the driver momentarily reduces or reverses the driving torque to release the intermediate dog hub 3. This is most easily achieved by lifting the accelerator or alternatively by dipping a clutch pedal, if provided. As soon as the torque transmitted through the intermediate dog hub 3 is relaxed the compressed spring 24 in the shift shaft 9 moves the dog hub 3 into engagement with the lower gear, the negative driving dogs engage, the gear 2 and shaft 1 are synchronised and the forward driving dog falls into engagement completing the down shift.

If there exists positive driving torque which holds a dog hub 3 into engagement when more than one down shift is attempted, without allowing the shift to be completed by reducing the torque, there would be, if no steps were taken to prevent it, the possibility that a negative driving dog hub for a lower gear could be engage while the positive driving dog of the other gear is still engaged. This would result in a lock up condition which is likely to cause significant damage to the assembly, but can be addressed as set out below.

Figure 11:
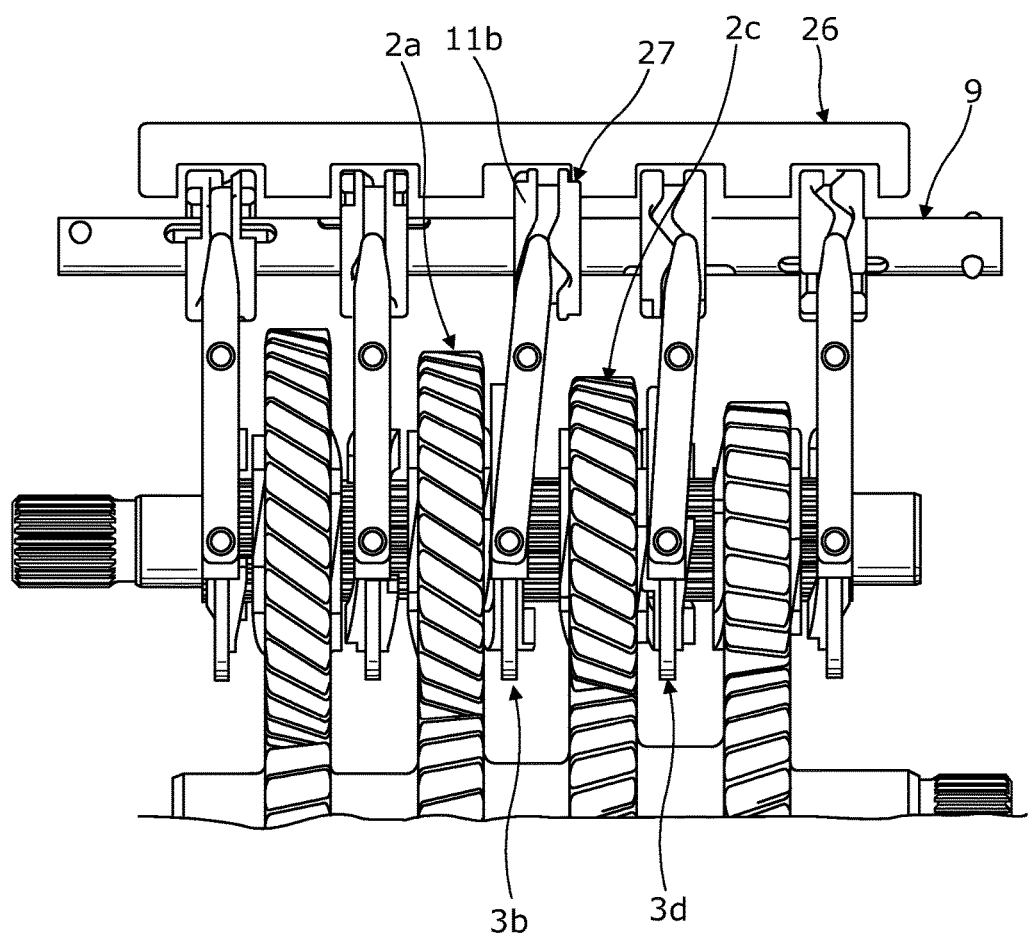
FIG. 11 is a plan view of a 4-ratio gearbox including a shifting mechanism according to an embodiment of the invention shown with a down shift pre-selected while positive driving torque is present.

FIG. 11 is a plan view of a 4-ratio gearbox including a shifting mechanism according to the invention shown with a down shift pre-selected while positive driving torque is present. Dog hub 3b is held in engagement with gear 2a. Dog hub 3d is moved towards gear 2c but as the gear 2c is rotating faster than the main shaft due to gear 2a being still engaged, the reverse driving dog 3d does not engage. In this condition the shift shaft 9 has been rotated to a position corresponding to the lower gear being fully engaged. As dog hub 3b is held in engagement with gear 2a the selector drum 11 b is displaced along the shift shaft 9 and the cut-out 27 is engaged with the gate 26. The shift shaft 9 can therefore not be rotated further to pre select a second down shift and so a lockup condition is prevented. Similar cut outs are present in both sides of each selector drum 11 and the gate 26 is adjacent to each side of each selector drum 11, therefore pre-selection of more than one up shift while negative torque is transmitted is similarly prevented. The cut-outs 27 therefore prevent the simultaneous engagement by a negative driving dog hub 3 of one gear 2 and a positive driving dog hub 3 of a higher gear 2, and also prevent the simultaneous selection of a positive driving dog hub 3 of one gear 2 and a negative driving dog 3 of a lower gear 2.

The shift shaft 9 in this example must be rotated by a predetermined angle on each shift. For manual operation this is most easily achieved using any form of indexing mechanism familiar to one skilled in the art for example a ratchet mechanism used for indexing a selector drum in a motor cycle gearbox. Alternatively any form of rotary actuator for example an electric servo motor, a hydraulic servo motor or a pneumatic servo motor could be used.

Other shifting mechanisms which provide the necessary control of the dog hubs 3 to achieve appropriate selection of gears may be devised by one skilled in the art within the scope of the present invention for example other mechanical manually operated devices, use of individual actuators for example electrometrical actuators, hydraulic actuator or pneumatic actuator for each of the dog hubs 3. Electronic or other forms of control system may be used to operate a gear mechanism according to the present invention. This could simply take the form of a means to determine when to make a shift and so automating the shifts using a mechanical shift mechanism or could be a system to control the operation of the individual dog hubs 3 in the necessary sequences.

The example preferred embodiment of the present invention as described above and illustrated in the attached Figures is only to be taken as a simple example of a gearbox according to the invention for the purpose of describing the various components and functions thereof. It will be apparent to one skilled in the art that the shifting components and mechanism according to the present invention may be used in many different configurations of gearbox or transmission for any purpose, for example using any number of different selectable gears or with selectable gears mounted on more than one shaft.

It will be noted that a gear shift as performed by a gearbox according the present invention results in substantially an instantaneous step change in the speed of the driving engine or other rotating power source without requiring use of a clutch (thus reducing complexity of use). Since this power source will have some inertia there will be a torque pulse imparted to the connected drive line. With the drive line of a vehicle there exist various sources of torsional flexibility, for example drive shafts, clutch plate springs and tyres, which will absorb the torque pulse. In the case of a high performance vehicle, for example a sports car or racing car this torque pulse may be acceptable to the driver, however for a vehicle requiring a higher level of refinement it may be desirable to include in the drive line a further torsionally flexible component or a torque limiting component. Alternatively a conventional clutch may be used to fully or partially disengage the engine while shifts are completed.

It should be noted that a gearbox or any of the components according to the invention may be used in any mechanism requiring the selective coupling of components to shafts. It should also be noted that a gearbox or any of the components described herein may be used in conjunction with any rotary power source and rotary load for example in a transmission coupling an electric motor to the wheels of a vehicle. Other examples of rotary power sources which could be used in conjunction with the present invention include, but are not limited to, hydraulic motors, pneumatic motors, internal combustion engines and gas turbine engines.

Any range or device value given herein may be extended or altered without losing the effect sought, as will be apparent to the skilled person for an understanding of the teachings herein.

The invention claimed is:

1. A drive member selection mechanism, comprising:
at least one drive member and at least two selector members arranged about a common axis in such a manner that the position of each of the at least two selector members along the common axis may be changed; wherein:
the at least one drive member includes a first and a second face, and further includes, on each face, at least one projection, and the at least two selector members include, on at least one face thereof, at least one complementary projection arranged to be selectively engaged with said at least one projection of the drive member;
the arrangement is such that, for the at least one respective drive member, the at least one projection on the first face thereof may be drivingly engaged with the at least one projection of one of the at least two selector members in a first torque connection after moving the one selector member along the common axis into engagement with the at least one drive member in use and the at least one projection on the second face thereof may be drivingly engaged with the at least one projection of another of the at least two selector members in a second torque connection opposed to the first torque connection after moving the other selector member along the common axis into engagement with the drive member in use;
a shift mechanism arranged to control the position of the at least two selector members along the common axis, the shift mechanism having at least two rotatable drums each provided with a circumferential track, where each of the at least two rotatable drums is substantially identical and mounted with a rotational displacement relative to another of the at least two rotatable drums, and where each of the at least two selector members is mounted in association with a separate said track, such that rotation of the corresponding rotatable drum determines the position of the associated selector member along the common axis; and
each track is symmetrical around each rotatable drum, the pattern of each track being repeated on both sides of each rotatable drum, and each of the rotatable drums further includes at least two shift arms, each of the respective two shift arms arranged in association with one side of each rotatable drum to engage with the track formed thereon.

2. The drive member selection mechanism according to claim 1, wherein, when drivingly engaged, the projections physically interfere such that they are positively drivingly engaged.

3. The drive member selection mechanism according to claim 1, wherein, when drivingly engaged, the projections are shaped so as to draw a drivingly engaged said selector member and said drive member together.

4. The drive member selection mechanism according to claim 1, wherein the projections are shaped such that, where relative rotation between said selector member and said drive member is in the opposite direction to the direction of torque for which driving engagement exists, the drive member and selector member are urged apart.

5. The drive member selection mechanism according to claim 1, wherein the projections on the at least one drive member and the selector members are arranged to limit the backlash when changing from one of the first or second torque condition to the other of the first or second torque condition.

6. The drive member selection mechanism according to claim 1, wherein said selector member which is not drivingly engaged in a given torque condition may be selectively moved away from said drive member.

7. The drive member selection mechanism according to claim 1, wherein three projections are provided on each engaging face of said drive member and said selector member.

8. The drive member selection mechanism according to claim 1, wherein the position of at least one of the at least two selector members is determined by at least two preloaded springs.

9. The drive member selection mechanism according to claim 1, further comprising at least two said drive members and at least three said selector members.

10. The drive member selection mechanism according to claim 9, wherein at least one of the at least three selector members is arranged between two drive members and includes first and second selector member faces with at least one said projection on each selector member face, wherein the at least one projection on the first selector member face may be brought into engagement with the at least one projection on one drive member and the at least one projection on the second selector member face thereof may be brought into engagement with the at least one projection on another drive member.

11. The drive member selection mechanism according to claim 9, wherein the drive members are gears.

12. The drive member selection mechanism according to claim 1, wherein the shift mechanism further comprises a gate arranged to prevent the selection of more than one drive member in driving engagement at any given time.

13. The drive member selection mechanism according to claim 12, wherein drive members provide different gear ratios and each can be in a condition of positive torque where the drive member is acting to drive an associated component, or negative torque where the associated component is driving the drive member and in which the shift mechanism is arranged to prevent the simultaneous engagement by a negative driving selector member of one gear and a positive driving selector member of a higher gear, or the simultaneous selection of a positive driving selector member of one gear and a negative driving selector member of a lower gear.

14. The drive member selection mechanism according to claim 1, wherein the rotatable drums are mounted on a shift shaft, and the or each drum is urged towards a rest position by at least two resilient members acting along the axis of the shift shaft.

15. The drive member selection mechanism according to claim 14, wherein the resilient members are springs mounted inside the shift shaft.

* * * * *